United States Patent [19]

Nathanson

[11] 4,010,322

[45] Mar. 1, 1977

[54] HIGH RESOLUTION LOW BANDWIDTH PORTABLE TELECOMMUNICATION SYSTEM

[75] Inventor: Harvey C. Nathanson, Pittsburgh, Pa.

[73] Assignee: Westinghouse Electric Corporation, Pittsburgh, Pa.

[22] Filed: July 28, 1975

[21] Appl. No.: 599,492

[52] U.S. Cl. .............................. 358/233; 340/311
[51] Int. Cl.² ...................... H04N 5/64; H04N 5/74
[58] Field of Search ............. 178/7.85, 7.91, 7.5 R, 178/7.5 D, 7.84, 7.87, 7.88; 325/318, 319, 352; 340/311

[56] References Cited

UNITED STATES PATENTS

| | | | |
|---|---|---|---|
| 3,577,205 | 5/1971 | Hobrough | 178/7.85 |
| 3,746,911 | 7/1973 | Nathanson | 178/7.5 D |
| 3,833,758 | 9/1974 | Ferrari | 178/7.91 |
| 3,845,238 | 10/1974 | Schneider | 178/DIG. 30 |

Primary Examiner—Howard W. Britton
Attorney, Agent, or Firm—W. G. Sutcliff

[57] ABSTRACT

A lightweight small volume high resolution telecommunicator display receiver and system in which the display is produced by using a high resolution cathode ray tube having an electostatically deflectable light reflective light valve array target for modulating light corresponding to the video signal to produce the display.

5 Claims, 4 Drawing Figures

HIGH RESOLUTION LOW BANDWIDTH PORTABLE TELECOMMUNICATION SYSTEM

BACKGROUND OF THE INVENTION

The audio message remote communicator has been widely accepted as a convenient reliable means of receiving information at a remote location. Such audio receivers are readily made in a pocket size for use by doctors, security agents, delivery men, repairmen, or the like. It is desirable to be able to transmit video information into a remote location and to have a compact pocket size display receiver which is moderate in cost and has very low power consumption.

The basic problem in attempting to design such a telecommunicator display receiver is to come up with a practical means of displaying the video information. It is desired that the display have approximately a 400-line information band, and in order to practically do this in a pocket or hand-held receiver, the density of the image elements per inch must be very high. It is also desired that such a device have a memory capability which does not require high power usage or consumption. The overall power consumption of the display device must be relatively low to facilitate operation with compatibly sized batteries.

Very small diameter cathode ray tubes can be made to have the requisite image points per square inch and can be coupled with a semiconductive memory or with a silicon dioxide storage target to provide a memory capability. In each of these cases, the power input and power operational requirements are relatively high; the memory must be continuously exercised during reading operation. The recently developed gas discharge panels which have been proposed to replace cathode ray tubes for display purposes generally do not have the requisite element density per inch, and require continuous power operation for providing memory.

An alternative technology is to utilize a deformorgraphic target in which an electron beam is used to deform a polymer layer corresponding to a video signal, and the polymer layer is used to reflect light to form the display image. Such tubes are well known, but in general the polymer out-gases in the high vacuum environment of the cathode ray tube in which it is incorporated, and thus requires continuous pumping to remain effective. This device is also generally a high voltage device and the basic resolution is poor.

SUMMARY OF THE INVENTION

A high resolution telecommunicator display system is provided in which the display receiver includes a novel high resolution cathode ray tube, which includes a light, and an electrostatically deflectable light reflective light valve target array for the cathode ray tube for modulating light corresponding to the video signal. In this system, a relatively low frequency transmitter having a modulated information bandwidth substantially less than conventional real time TV (4 mHz) is utilized to transmit the video signal to the receiver. A slow scan video camera can be utilized to generate the video signal which is to be transmitted to the remote location. The high resolution pocket size telecommunicator display receiver is a relatively low frequency receiver, and utilizes the cathode ray tube with a special light valve target to provide the memory and display capability for the receiver. The telecommunicator display receiver includes input signal receiver means and cathode ray tube drive means for establishing an electronic charge pattern on the light valve target array corresponding to the received display image input signal. The charge pattern is maintained on the light valve target without the need for additional power input or refresh power to provide the memory capability for the devices. Display image readout means are provided comprising optical means and a light source coupled to the cathode ray tube faceplate and the light valve target for projecting and reflecting light from the light valve target when it is desired to read or project the image. The reflected light from the target is modulated in correspondence to the degree of deflection of individual light valves, and the reflected light is focused in an image viewing plane. The display image can be repeatedly read out without altering the charge pattern of the light valve target, and the only power requirement for such readout is the light source power requirement. Battery power supply means are included within the telecommunicator for providing power to the receiver and cathode ray tube drive means. The power requirements are very low, being about 5000 milliwatts for the receiver, the display system, and also for the light source.

DESCRIPTION OF THE PREFERRED EMBODIMENT

Figure 2:
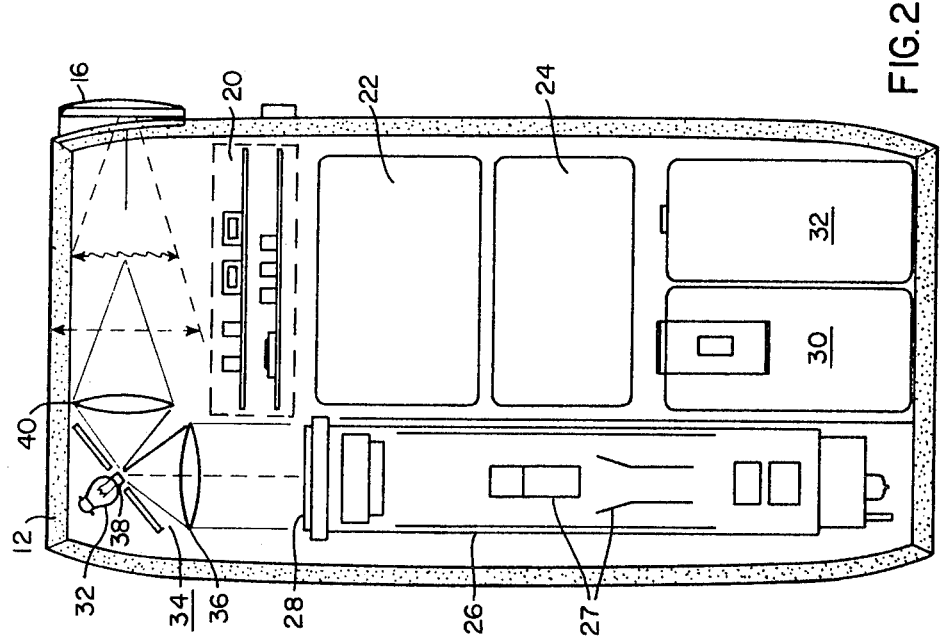
FIG. 2 is an illustration with the cover removed of the relative disposition of the display receiver components in the display receiver casing.
Figure 1:
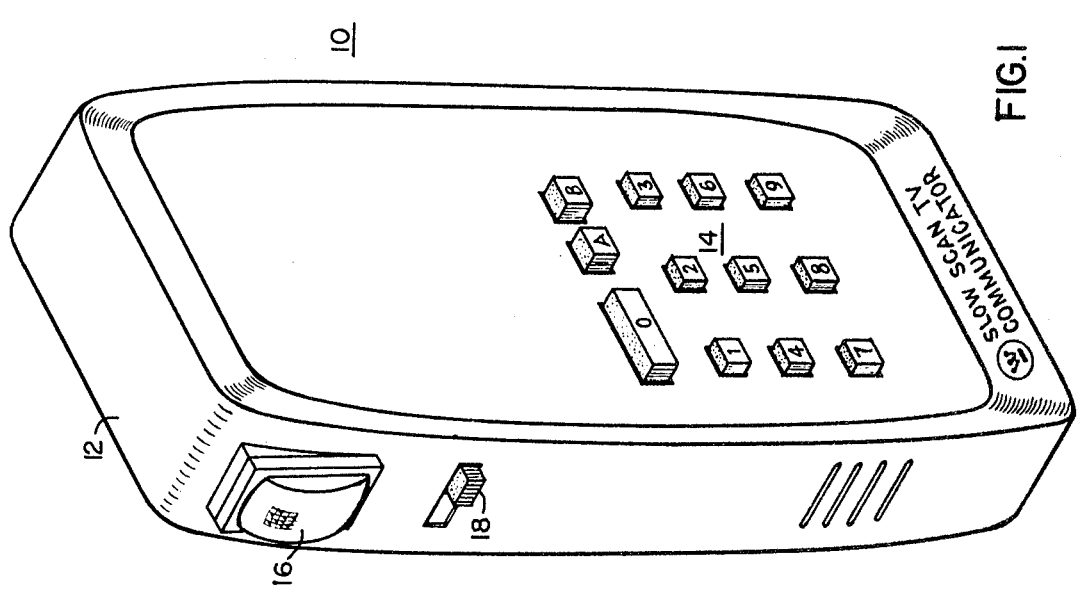
FIG. 1 is a schematic representation of the pocket size telecommunicator of the present invention.

The display receiver 10 comprises a hand-holdable pocket type telecommunicator receiver having a casing 12 with digital tuning selector means 14. A viewing window 16 is provided through the casing 12 and an on-off switch 18 is also provided.

In the schematic illustration of FIG. 2, the working components of the receiver are schematically represented. A video signal receiver and command generator 20 receives the transmitted relatively low frequency signals which are typically in the range of 1 megahertz.

The low frequency receiver 20 includes the following elements which are not shown, an antenna, and a tuned amplifier providing frequency selection of the desired signal from the antenna. The tuned amplifier has sufficient gain and low noise characteristics to supply appropriate drive to the demodulator 22. The gain of the tuned amplifier is automatically adjusted for input signal level changes due to variable receiving conditions by monitoring the carrier level at the demodulator.

The limiter demodulator 22 separates the video-sync information from the transmitted carrier signal and provides some noise limiting action. The demodulator also senses the carrier level and thus provides a DC bias for the tuned amplifier for gain control thereof. A low pass filter is included to allow only the desired lower frequency video-sync signals to be coupled to a signal gain amplifier which also is impedance matched with the signal processing circuitry of scan means 24. The scan means 24 comprises a sync separator which includes limiting, differentiation and integration networks for separating the horizontal and vertical sync pulses from the video signal. A start code detector is included which senses or recognizes a start identification signal and then provides an output which enables the sweep circuits. The sweep circuits generate horizontal and vertical sawtooth signals, which, synchronized by the sync pulses, provide the scan voltages for the tube deflection plates to give a roster scan of the tube target. The output of the start code detector also enables the circuitry which controls the tube write voltages.

The cathode ray memory tube 26 has a small diameter, typically about 5/8 inch diameter, and is a low power device typically about 1000 milliwatts, which can use electrostatic deflection means 27 for sweeping the electron beam across the light valve target 28 which is disclosed in the faceplate of the cathode ray tube. The actual target structure may be more clearly illustrated and understood by reference to U.S. Pat. No. 3,746,911. The power supply means 30,32 are operatively connected to the receiver means and the scan and deflection generators as well. The light source 32 is disposed within the casing 12 and is optically coupled by an optical means 34 to the target 28. The optical means 24 includes a collimating lens 36, a schlieren optical stop 38, and a focusing lens 40. The light source 32 together with the light valve target 28 and the optical means function to project and display an image which may be viewed through the viewing window 16. The light source 32 is also operatively connected to the power supply and the on-off switch.

A relatively low frequency transmitter is utilized to generate a video signal which is received by the display receiver 10. The transmitter can have a modulated information bandwidth substantially less than conventional real time TV, which is preferably about 4 megahertz. Such a transmitter in conjunction with a selector mechanism and a local store of information can be used to transmit the information in a wireless manner under slow scan conditions. Typically a broadcast and transmitter with a carrier band of 0.5 to 1.5 megahertz, and a slow scan video camera with about 10 kilohertz can be used to send a frame of the video signal in from 10 to 30 seconds.

A command signal from the main transmitter initiates operation of the display receiver by turning on the cathode ray tube heater filaments and initiates power to the appropriate receiver circuitry. After a few seconds for filament warm up, the cathode ray tube transmission is initiated under slow scan conditions. The light valve target of the cathode ray tube is scanned in synchronism with the transmitting slow scan signal by means of synchoronizing pulses from precision counting and timing circuitry. The received video input signal is recorded on the light valve matrix as a gray scale deformation signal, as will be explained. After receipt of the full frame of video information, the filament and biasing signal from the receiver circuitry are disconnected. Only the low power receiver means remain on for new information and housekeeping. To view the stored video information, the on-off switch 18 turns on the flashlight type incandescent light source 32, which illuminates the light valve target faceplate. The video image remains permanently stored on the face of the tube for days with all power off. It can be erased by proper command control in about 1/30 of a second.

Figure 3:
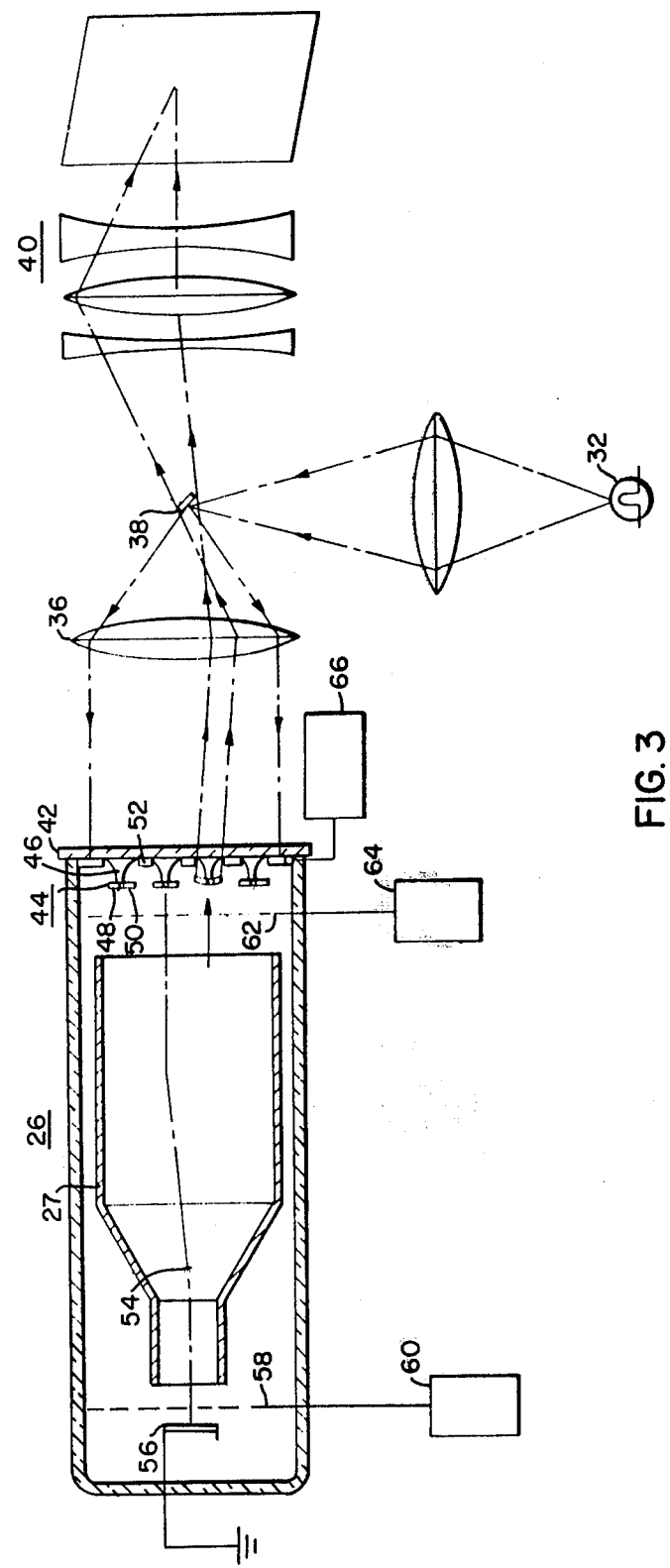
FIG. 3 is an enlarged view of an operational schematic of the display system of the present invention.

The light valve target 28 will now be described in more detail by reference to FIG. 3. The matrix array of approximately 200,000 light valves aligned in rows and columns are disposed from the interior of the faceplate or cathode ray tube. As seen in FIG. 3, the light transmissive substrate 42 serves as the faceplate of the cathode ray tube. Individual light valves 44 are supported from the interior surface of the faceplate substrate by means of a centralized support post 46 which is typically made of silicon. A generally planar thin deflectable member 48 is supported at the top of the central post 46. The thickness of planar 48 is typically from about 1,000 to 5,000 Angstroms and has a highly reflective aluminum layer 50 deposited on top of the planar portion facing the cathode of the tube. An aluminum grid 52 is also deposited between the perimeter portions of adjacent light valves. The planar portions are typically square in configuration and are about 40 to 50 microns on a side with the spacing between perimeters of light valves being of the order of about 5 microns. The height of the planar portion above the substrate is about 5 microns. The 200,000 individual light valves or mirrors represent a like number of resolution points in a very small size target.

In operation, a video signal is used to drive the electron beam of the cathode ray tube which is scanned across the target, and an informational charge pattern is deposited upon individual light valves in correspondence to the video signal transmitted. The planar portions 48 of a light valve are deflectable toward the grid 52 provided on the substrate as a function of the magnitude of the video signal charge pattern deposited.

An information charge pattern is written on the light valve target by scanning the light valve target with the electron beam 54 emitted from cathode 56. The electron beam is modulated by applying a voltage to control grid 58 from modulation means 60. The electrons of the scanning beam are accelerated to above first cross-over potential. A field mesh 62 of 750 lines per inch pitch is located closely spaced from the light valve target. Typically about 200 micrometers spacing. The field mesh 62 is held at about 600 supplied from source 64 and effectively collects the secondary electrons produced by the writing beam. The reference grid electrode 52 on the target substrate is typically at 400 V supplied from source 66. Since more electrons leave the light valve surfaces than land, there is a net positive charge on the light valve and it will charge towards equilibrium with the field mesh, electrostatic forces cause the light valve to deflect as a function of the video signal.

The information pattern on the light valve array can be erased selectively or completely. Raising the reference grid electrode 52 to the potential of field mesh 62 and scanning the target will completely erase the target. Selective erase can be accomplished by scanning only the desired subsection of the target array. The image may be viewed by directing light from the light source 32 through lens 36 and through the substrate faceplate 42, with the light reflected from the deflected planar portions of the light valve primarily by the highly reflective aluminum layer 50. The light passes back through the faceplate collimating lens and is directed onto a schlieren optical stop 38, whereby reflected light from deflected light valves is thereby passed onto the focusing lens 40 for formation of the display image. Light reflected from undeflected light valves is stopped by the opaque portions of the schlieren lens. The image is formed at the focus of lens 40 and may be viewed and enlarged by the magnifying viewing window 16.

The video information which is deposited as a charge upon the individual light valve remains upon individual light valves after the receiver circuit is disconnected and the planar portion remains deflected. There is no need for continuous scan and beam circuitry power and the light valve target operates as a non-volatile memory. The light valve permits a very high level of contrast discrimination in the viewed display and the charge pattern can be selectively erased and overwritten for update purposes. The high resolution of this display coupled with its portability should permit transmission of data or reasonable photographic detail.

Figure 4:
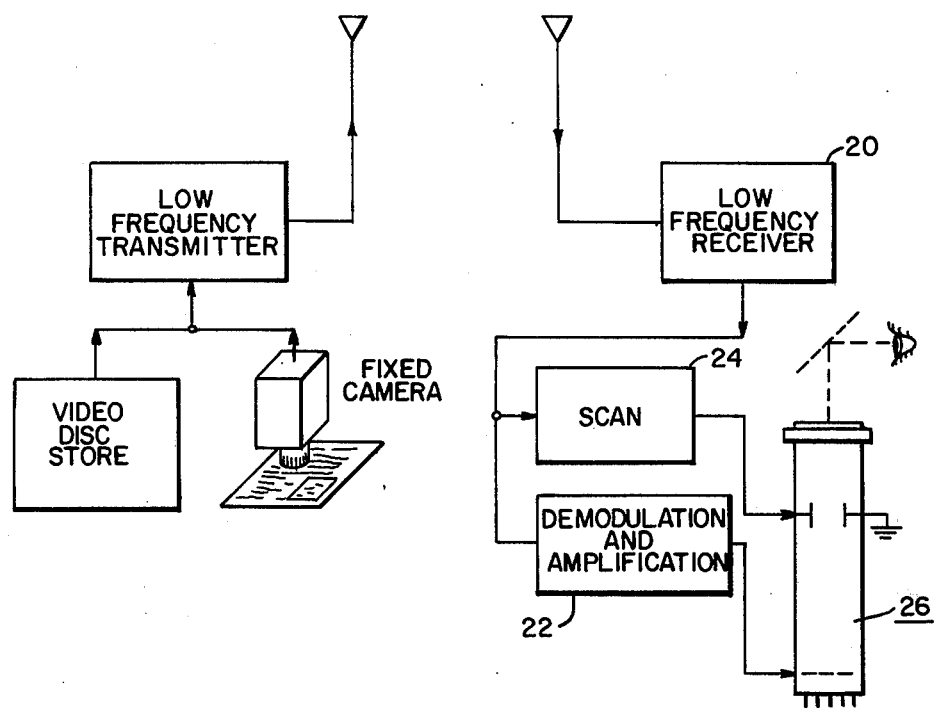
FIG. 4 is a schematic representation of the signal and display generation systems.

The overall operation of the system is illustrated in FIG. 4, wherein information stored on a video disc storage means may be mixed with the information from a camera tube and is transmitted via a low frequency transmitter. The low frequency receiver telecommunicator receiver includes the low frequency receiver 20, the demodulator and amplifier means 22, and the scan generator means 24, with the cathode ray tube 26. The output of the demodulation and amplifier means 22 provides the potential source signals for means 60, 64 and 66. The electrostatic deflection means within the tube 26 are schematically illustrated and are driven from the output signal of the scan generator means 24.

I claim:

1. A high resolution telecommunicator display receiver comprising:
   a. input signal receiver means;
   b. a high resolution cathode ray tube, which includes a light transmissive faceplate from which is closely internally spaced an electrostatically deflectable, light reflective, light valve array target;
   c. the light array target includes an array of spaced apart, individually electronic charge addressable members which are deflectable as a function of an electronic charge thereon;
   d. cathode ray tube drive means connected between the input signal receiver means and the cathode ray tube for establishing an electron charge pattern on the light valve target array corresponding to the communicated display image input signal, which charge pattern is maintained thereon without additional power input;
   e. display image readout means comprising optical means and a light source coupled to the cathode ray tube faceplate for projecting light upon the light valve target, with the reflected light from such target being modulated in correspondence to the degree of deflection of individual light valves, which reflected light is focused in an image viewing plane;
   f. integral power supply means for providing power to the receiver means and the cathode ray tube drive means, of less than about 5000 milliwatts, and power for the light source.

2. The high resolution telecommunicator display receiver specified in claim 1, wherein the light valve array target comprises rows and columns of individual light valves which comprise a central support post extending from the light transmissive faceplate to the underside of a generally planar, deflectable, light reflective element which is disposed generally parallel to the faceplate.

3. The high resolution telecommunicator display receiver specified in claim 2, wherein a plurality of symmetrical spaced slits are provided in the planar, deflectable light reflective element radiating outward from the central support post and defining individually deflectable segments of the element.

4. The high resolution telecommunicator display receiver specified in claim 1, wherein the display can be stored as an electronic charge on the light valves and the display image can be repeatedly read out without altering the charge pattern by actuating the light source, with the light source power being the only power requirement for such readout.

5. The high resolution telecommunicator display receiver specified in claim 1, wherein the operational power requirement for the display receiver is about 5000 milliwatts.

* * * * *